United States Patent
Stiller

(10) Patent No.: US 10,207,922 B2
(45) Date of Patent: Feb. 19, 2019

(54) METHODS FOR PRODUCTION OF CARBON AND HYDROGEN FROM NATURAL GAS AND OTHER HYDROCARBONS

(71) Applicant: West Virginia University Research Corporation, Morgantown, WV (US)

(72) Inventor: Alfred H. Stiller, Morgantown, WV (US)

(73) Assignee: WEST VIRGINIA UNIVERSITY RESEARCH CORPORATION, Morgantown, WV (US)

( * ) Notice: Subject to any disclaimer, the term of this patent is extended or adjusted under 35 U.S.C. 154(b) by 66 days.

(21) Appl. No.: 15/415,640

(22) Filed: Jan. 25, 2017

(65) Prior Publication Data

US 2017/0217772 A1    Aug. 3, 2017

Related U.S. Application Data

(60) Provisional application No. 62/289,566, filed on Feb. 1, 2016.

(51) Int. Cl.
*C01B 3/24* (2006.01)
*B01J 21/10* (2006.01)
(Continued)

(52) U.S. Cl.
CPC .............. *C01B 3/24* (2013.01); *B01J 21/10* (2013.01); *C01B 3/26* (2013.01); *C01B 32/05* (2017.08);
(Continued)

(58) Field of Classification Search
CPC .... C09C 1/54; C01B 3/44; C01B 3/30; C01B 2203/0272; C01B 2203/0805;
(Continued)

(56) References Cited

U.S. PATENT DOCUMENTS 2,760,847 A * 8/1956 Boedeker ................. B01J 8/20
                                              422/150
5,767,165 A * 6/1998 Steinberg ................. C01B 3/24
                                              423/453
(Continued)

FOREIGN PATENT DOCUMENTS

| CN | 100439238 C | 12/2008 |
|---|---|---|
| FR | 1071197 | 8/1954 |
| WO | WO2005030391 | 4/2005 |

OTHER PUBLICATIONS

Wang et al. "Hydrogen generation by direct decomposition of hydrocarbons over molten magnesium." Journal of Molecular Catalysis A: Chemical 283 2008 153-157.*
(Continued)

*Primary Examiner* — Amber R Orlando
*Assistant Examiner* — Syed T Iqbal
(74) *Attorney, Agent, or Firm* — The Marbury Law Group, PLLC

(57) ABSTRACT

A method for producing elemental carbon and hydrogen gas directly from a hydrocarbon (for example, natural gas or methane) using a chemical reaction or series of reactions. In an aspect, other materials involved such as, for example, elemental magnesium, remain unchanged and function as a catalyst.

18 Claims, 1 Drawing Sheet

Diagram of magnesium carbide reactor set up

(51) Int. Cl.
*C01B 3/26* (2006.01)
*C01B 32/05* (2017.01)

(52) U.S. Cl.
CPC ........... *C01B 2203/0272* (2013.01); *C01B 2203/0805* (2013.01); *C01B 2203/1241* (2013.01)

(58) Field of Classification Search
CPC . C01B 2203/1241; C01B 31/02; C01B 32/05; C01B 3/24; C01B 3/26; B01J 10/005; B01J 8/20; B01J 21/10
See application file for complete search history.

(56) References Cited

U.S. PATENT DOCUMENTS

| | | | |
|---|---|---|---|
| 6,218,326 B1 * | 4/2001 | Datta | B01J 23/42 502/250 |
| 6,670,058 B2 | 12/2003 | Muradov | |
| 6,995,116 B2 | 2/2006 | Wang et al. | |
| 7,157,167 B1 | 1/2007 | Muradov | |
| 2002/0151604 A1 | 10/2002 | Detering et al. | |
| 2005/0063900 A1 | 3/2005 | Wang et al. | |
| 2008/0159938 A1 | 7/2008 | Mauthner et al. | |
| 2008/0210908 A1 | 9/2008 | Zhu et al. | |
| 2008/0263954 A1 | 10/2008 | Hammel et al. | |
| 2014/0271441 A1 | 9/2014 | Stiller | |
| 2014/0328749 A1 | 11/2014 | Hammel et al. | |
| 2016/0002049 A1 | 1/2016 | Stiller | |
| 2016/0115600 A1 | 4/2016 | Stiller et al. | |

OTHER PUBLICATIONS

Wang et al. "Hydrogen generation by direct decomposition of hydrocarbons over molten magnesium", Journal of Molecular Catalysis A: Chemical 283 (2008) 153-157 (Year: 2008).*
Abanades A., et al., "Development of methane decarbonisation based on Liquid Metal Technology for CO2-free production of hydrogen", Int'l J. of Hydrogen Energy, Elsevier Sci. Publishers B.V., Barking GB, vol. 41(19) Dec. 23, 2015, pp. 8159-8167.
Abbas et al., "Hydrogen production by methane decomposition: A review", I nt'l Journal of Hydrogen Energy, 3 5 (2010 ) 1160-1190.
Aiello et al., "Hydrogen production via the direct cracking of methane over Ni/SiO2", Applied Catalysis A: General, vol. 192 (2000) pp. 227-234.
Gulevich et al., "Technologies for hydrogen production based on direct contact of gaseous hydrocarbons and evaporated water with molten Pb or PB-Bi", Energy Conversion and Management, Elxwevier Sci. Pub. Oxford, GB, vol. 49 (7), Jul. 1, 2008, pp. 1946-1950.
Nuernberg et al., "Methane conversion to hydrogen and nanotubes on Pt/Ni catalysts supported over spinel MgAl2O4", Catalysis Today, vol. 176, Issue 1, Nov. 1, 2011, pp. 465-469.
Serban et al., "Hydrogen Production by Direct Contact Pyrolysis of Natural Gas", Fuel Chemistry Division Preprints 20 02, 47(2), 746.
Ke Wang, "The preparation of hydrogen over molten metal and the synthesis of methyl 3, 3-dimethylpropionate over homogeneous catalyst", thesis, Hunan University (2009)—in Chinese with English abstract.
Zhou et al., "Reaction Engineering, Kinetics and Catalysis: Unsupported nickel catalysts for methane catalytic decomposition into pure hydrogen", AIChE Journal, vol. 60, Issue 8, pp. 2907-2917, Aug. 2014.
International Search Report and Written Opinion received in connection with International Application No. PCT/US2017/014955; dated Apr. 12, 2017.

* cited by examiner

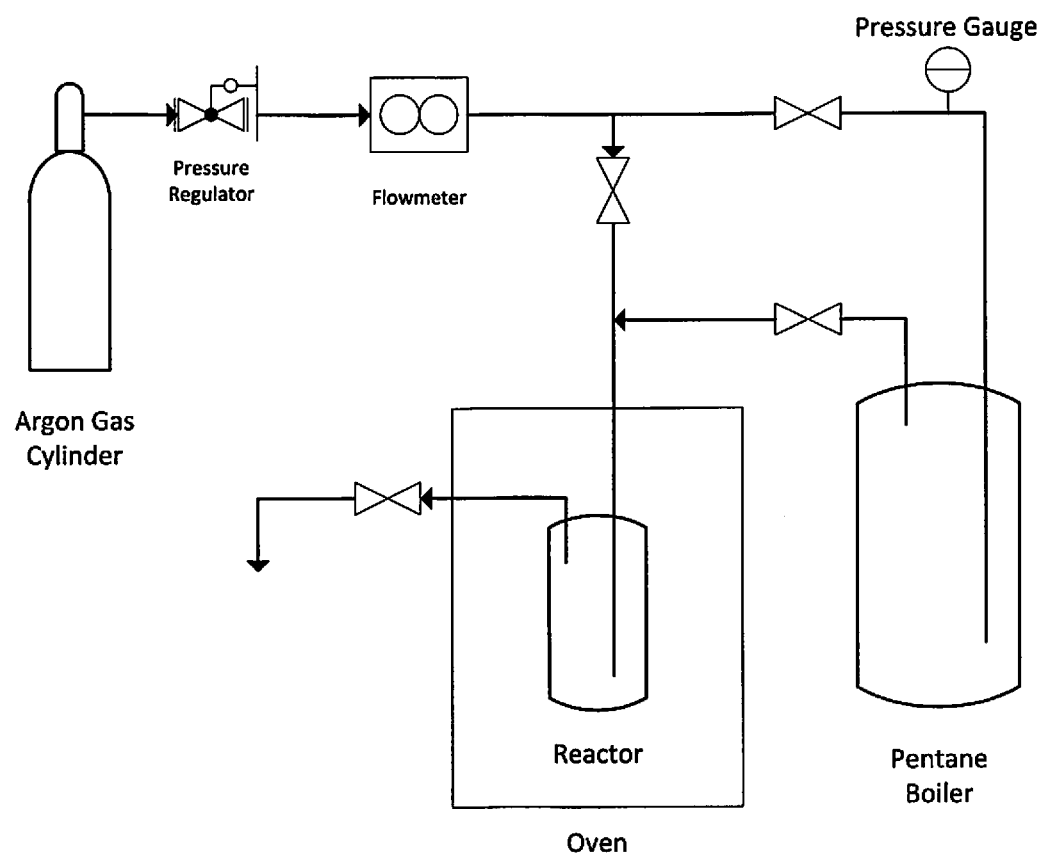
Diagram of magnesium carbide reactor set up

METHODS FOR PRODUCTION OF CARBON AND HYDROGEN FROM NATURAL GAS AND OTHER HYDROCARBONS

BACKGROUND

There is a need to develop new methods for producing elemental carbon and/or hydrogen gas. There is also a need for processing the hydrocarbons produced from shale gas which are not easily condensed (for example, methane).

U.S. Pat. No. 2,760,847 describes a process for the production of hydrogen and carbon from methane. Magnesium can be used as a molten metal to facilitate the process. However, high temperatures are needed.

U.S. Pat. No. 6,995,115 describes a process for the production of hydrogen and carbon from methane by thermal decomposition including use of catalysts such as $Ni_xMg_yO$ or $Ni_xMg_yCu_zO$.

US Patent Publication 2008/0263954 describes a process to convert hydrocarbons to hydrogen and elemental carbon. MgO can be used as a catalyst carrier.

US Patent Publication 2008/0210908 describes a process to convert hydrocarbons into hydrogen and carbon using microwaves and iron catalyst.

See also, "Hydrocarbon Production by Methane Decomposition: A Review," Abbas, et al., *Int. J. of Hydrogen Energy*, 35, 3, February 2010, 1160-1190.

See also, "Hydrogen Generation by Direct Decomposition of Hydrocarbons over Molten Magnesium," Wang et al. *J Molecular Catalysis A*: Chemical 283 (2008) 153-157.

See also English Abstract, Doctoral Thesis, Ke Wang, Hunan University, December 2009, "The Preparation of Hydrogen over Molten Metal and the Synthesis of Methyl 3,3-Dimethylpropionate over Homogeneous Catalyst."

See also, Serban et al., "Hydrogen Production by Direct Contact Pyrolysis of Natural *Gas,*" *Fuel Chemistry Division Preprints,* 2002, 47(2), 747.

See also, Abbas et al., "Hydrogen Production by Methane Decomposition: A Review," *Int'l J. Hydrogen Energy,* 35 (2010), 1160-1190.

No admission is made that any reference or description provided herein is prior art.

SUMMARY

The disclosure provides for methods of producing elemental carbon and hydrogen gas directly from a hydrocarbon such as natural gas (for example, methane) using a chemical reaction or series of reactions. In an aspect, other materials involved, for example, elemental magnesium, remain unchanged and act as a catalyst. The temperature of reaction is selected so that the desired reaction can occur under the desired conditions.

One aspect provides for a method of producing elemental carbon and hydrogen comprising reacting at least one molten metal with at least one hydrocarbon at a temperature sufficient to melt the metal, wherein said reaction produces elemental carbon and hydrogen. The temperature to melt the metal can be varied depending on the metal, and the optimal temperature can be reviewed and selected. For example, the temperature can be, for example, 10° C. to 500° C., or 10° C. to 250° C., or 10° C. to 100° C. above the melting point of the metal. The metal can be, for example, magnesium or lithium. While the reaction and invention is not limited by theory or mechanism, the reaction can occur via a carbide or sesquacarbide intermediate.

In one embodiment, the hydrocarbon is a gas at 25° C. and 760 torr. In another embodiment, the hydrocarbon is a liquid at 25° C. and 760 torr. In another embodiment, the hydrocarbon is a solid at 25° C. and 760 torr. In another embodiment, the hydrocarbon is methane.

Another aspect provides for a method of producing elemental carbon and hydrogen by reacting elemental magnesium with a hydrocarbon at a temperature range of about 600° C. to 1000° C., wherein the reaction produces elemental carbon and hydrogen.

In other embodiments, the reaction conditions for the processes described herein occur at temperatures above about 600° C., above about 650° C., above about 700° C., above about 750° C., above about 800° C., above about 850° C., or above about 900° C. In yet another aspect, the reaction conditions for the processes described herein occur at temperatures in a range from about 600° C. to about 950° C., from about 600° C. to about 900° C., from about 650° C. to about 950° C., from about 650° C. to about 900° C., from about 700° C. to about 950° C., from about 700° C. to about 900° C., about 650° C. to about 1,000° C., or from about 700° C. to about 1,000° C.

In yet another aspect, the reaction described herein takes place in a single vessel and/or a single process step. In other cases, multiple steps occurring in multiple vessels can be used.

DETAILED DESCRIPTION

Introduction

U.S. priority provisional application Ser. No. 62/289,566 filed Feb. 1, 2016 is hereby incorporated by reference in its entirety.

U.S. patent application Ser. Nos. 14/213,533; 14/772,629; and 14/886,319 are hereby incorporated herein by reference in the entirety.

References cited herein can be relied up for enabling disclosure.

The term "comprising" can be substituted by the term "consisting essentially of" or "consisting of."

The terms "sesquicarbide" and "sesquacarbide" are used herein equivalently. Sesquicarbides contain the polyatomic anion $C_3^{-4}$ and contains carbon atoms with an sp1 hybridization. Two examples of sesquicarbides are magnesium carbide ($Mg_2C_3$) and lithium carbide ($Li_4C_3$).

Sesquicarbides are of particular use for the preparation of sp1 carbon. One can produce $Mg_2C_3$ in the laboratory by bubbling methane through molten magnesium metal under an inert argon atmosphere at over 750° C. Other hydrocarbons such as pentane May also be used. Also, molten magnesium (Mg) reaction is another area of chemistry where little has been conducted. Research in molten Mg reactions have been limited because of the dangers associated with molten Mg, especially with the process generating hydrogen gas as well.

Hydrocarbon

However, a process very similar to the synthesis of the magnesium sesquicarbide can be used to convert methane directly into carbon in the form of graphite and hydrogen gas. In one embodiment, methane can be bubbled through a molten solution of metal, such as Mg, and optionally a metal salt such as magnesium chloride salt. In one embodiment, when heated to a temperature of, for example, over 750° C. under an argon atmosphere the elemental metal, such as Mg metal, and metal salt, such as $MgCl_2$, both melt to form a liquid solution. In one embodiment, similar to the Mg sesquicarbide synthesis, the hydrocarbon such as methane is bubbled through the solution to produce either $MgC_2$ (magnesium carbide) or $Mg_2C_3$ and hydrogen gas that can be collected as a value added product. The carbide then reacts with the metallic salt based on the original chemistry of the carbon producing carbide reaction. The $Mg_2C_3$ and $MgCl_2$ are converted to elemental carbon in the form of graphite, elemental Mg metal and $MgCl_2$, which would remain as part of the liquid solution. Therefore, the Mg metal and $MgCl_2$ salt would remain unchanged throughout the overall process while the methane would be converted to pure carbon and hydrogen gas.

Thus, the disclosure provides for a method for producing elemental carbon and hydrogen gas directly from a hydrocarbon such as natural gas (methane) using a chemical reaction or series of reactions. The disclosure also provides for a method for producing elemental carbon and hydrogen gas directly from natural gas (for example, methane) using a chemical reaction or series of reactions in a single vessel.

Molten Metal and Molten Magnesiuim

In an aspect, other materials involved, for example, the metal such as elemental magnesium, remain unchanged and act as a catalyst. The metal can be purified in advance to, for example, remove metal oxide. For example, the magnesium can be pre-treated to remove MgO. The magnesium can be loaded into a crucible, such as an alumina crucible, which can be then loaded into a high temperature reactor such as, for example, a high temperature stainless steel reactor. Elemental lithium can be also used.

Reaction Conditions; Temperature of Reaction

The temperature of the reaction can be sufficiently high to melt the metal and drive the reaction to produce desired products. In an aspect, the reaction conditions for the processes described herein occur at temperatures over about 800° C. In another aspect, the reaction conditions for the processes described herein occur at temperatures above about 600° C., above about 650° C., above about 700° C., above about 750° C., above about 800° C., above about 850° C., or above about 900° C. In yet another aspect, the reaction conditions for the processes described herein occur at temperatures in a range from about 600° C. to about 800° C., from about 700° C. to about 800° C., from about 750° C. to about 850° C., from about 800° C. to about 900° C., or from about 600° C. to about 1000° C. The temperature can be greater than the melting point of magnesium chloride, which is about 714° C.

In an aspect, the elemental magnesium and magnesium chloride are included as catalysts for the methods described herein.

Magnesium carbide can be formed by reacting magnesium with methane or other hydrocarbons, for example pentane. This reaction is below (Scheme I):

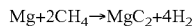  Scheme I

In an aspect, this scheme is considered a method for generating hydrogen. The literature suggests that magnesium acetylide disassociates to produce elemental carbon and magnesium sesquicarbide. At higher temperatures, magnesium sesquicarbide disassociates to produce elemental magnesium and elemental carbon as described in Schemes II and III.

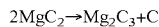  Scheme II

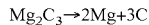  Scheme III

Reactors can be used as known in the art. For example, FIG. 1 shows a diagram of an exemplary magnesium carbide reactor set up.

In the reaction described above, methane is used as both a source of hydrogen and subsequently a source of elemental carbon. In another aspect, another hydrocarbon, for example ethane, propane, butane, or pentane, is utilized. Potential reactants can also include polyethylene waste materials, plastics, rubbers, or heavier hydrocarbons, for example, waxes. One example of a series of reactions is formation of $MgC_2$ or $Mg_2C_3$, which can then be reacted with a metal halide such as $MgCl_2$ to produce elemental Mg metal, elemental carbon, and product $MgCl_2$ by the reaction below in Scheme IV.

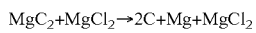  Scheme IV

In the overall chemical reaction series, the elemental Mg and $MgCl_2$ remain unchanged and the methane is converted directly to elemental carbon and hydrogen gas. In an aspect, a salt or salts can be added to reduce the melting points of components in the blend. Magnesium has a melting point of about 648° C. while $MgCl_2$ has a melting point of about 714° C., but the mixtures can make a eutectic with a significantly lower melting point. In an aspect, the disassociation of the Mg carbides to elemental Mg and elemental Carbon can also be facilitated by the salt presence.

Isolation of Product

Methods known in the art can be used to isolate and characterize the reaction products, including the hydrogen and the carbon reaction products.

Applications

The disclosure further provides for a method of using methane or other hydrocarbon materials to produce hydrogen gas by utilizing a method described herein. In an aspect, amorphous carbon is produced by such methods and may be used in supercapacitors. The disclosure further provides for a method of utilizing hydrocarbon materials, for example, waste polyethylene to produce a stream of hydrogen gas.

In another aspect, the disclosure provides for a method for converting methane directly to carbon and hydrogen gas by heating $MgC_2$ until it becomes the sesquicarbide, $Mg_2C_3$, and elemental carbon, for example, as shown in Scheme II. If the sesquicarbide is further heated, it can disassociate back to elemental magnesium and carbon, for example, as shown in Scheme III. In an aspect, the role of the magnesium appears to be a catalyst because it comes out of the reaction sequence that same way it started—as elemental magnesium.

Once the sesquicarbide is formed it can be reacted with a proton donor to produce methyl acetylene. Methyl acetylene can be run through a catalytic cracker to produce trimethyl benzene that is a high octane gasoline. In an aspect, this is accomplished by reacting sesquicarbide with methanol and reacting the methyl acetylene in a zeolite catalyst. In yet another aspect, the magnesium methoxide can be regenerated by reacting it with hot methane to produce methanol for recycle and elemental magnesium. Some of the excess hydrogen produced can be used in the catalytic cracker to produce other desired products.

In another aspect, the disclosure provides for a method of utilizing a redox reaction or galvanic or electrolysis reaction to oxidize a carbide anion. In an aspect, the anion is a sesquicarbide anion and when it is oxidized it produces a polymer that is sp1 in character. In yet another aspect, the polymer that is sp1 in character is superconductive including superconductive at low temperatures.

The Oxidation of Carbides Anion:

The disclosure also provides for the oxidation of carbide anions to prepare elemental carbon in the form of acetylene black. In an aspect, the acetylene black can be used in supercapacitors. Acetylene black is prepared in the art by the following reaction (Scheme V):

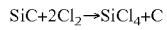
Scheme V

The reaction in Scheme V can be considered an oxidation of the carbide anion as the chlorine atoms pick up electrons from the carbide anion while the silicon atoms remain as +4 ions. At the temperatures this reaction is run the silicon tetrachloride volatilizes leaving behind pure carbon. Should an electrolysis cell be utilized, at very low voltages, acetylene black can be produced in a manner that is useful for super capacitors.

In an aspect, the disclosure provides for the production of carbon black or acetylene black by utilizing the methods described herein.

In this aspect magnesium sesquicarbide is oxidized with one or more low melting point halide salts. In an aspect, the cation of one or more low melting point halide salts exhibits a relatively low oxidation potential so that not much energy is required to reduce that cation to its elemental state. When that reduction occurs the sesquicarbide anion would be oxidized to the elemental state. Accordingly, the elemental carbon would retain its sp1 character and be in a polymeric chain in which all or substantially all of the atoms are bonded in sp1 hybridization or the carbon could be in a flat plate like structure in which the middle carbon would be an sp1 state while the terminal carbons would be in sp2 configurations. In an aspect, the polymer produced from such a reaction exhibit superconductor characteristics In an aspect, the disclosure provides for a method of oxidizing a sesquicarbide anion, for example, a magnesium or lithium sesquicarbide anion, wherein the sesquicarbide anion is oxidized with a low potential such that the oxidized anion retains its hybridization as sp1. In another aspect, the disclosure provides for a method of oxidizing a sesquicarbide anion, for example, a magnesium or lithium sesquicarbide anion, wherein the sesquicarbide anion oxidized with a low potential such that the oxidized anion retains its hybridization as sp1 and that the resulting material is a linear chain polymer. In yet another aspect, the disclosure provides for a method of oxidizing a sesquicarbide anion, for example, a magnesium or lithium sesquicarbide anion, wherein the sesquicarbide anion oxidized with a low potential such that the oxidized anion becomes a blend of sp1 and sp2 material. The disclosure further provides for a method of oxidizing a sesquicarbide anion, for example, a magnesium or lithium sesquicarbide anion, wherein the sesquicarbide anion oxidized with a low potential such that the oxidized anion becomes a blend of sp1 and sp2 materials in the form of flat plate structures.

In laboratory experiments, a 400 ml Parr reactor was fitted with an alumina crucible. The solid magnesium ribbon was placed inside of the aluminia crucible and sealed inside of the reactor.

The Parr reactor with its lid and attachments was placed in a programmable oven that could easily obtain a Temperature of 750° C. The gas cylinders and other reactants were placed outside the oven that was housed in a hood for safety reasons. A weighted quantity of Mg turnings was placed in the crucible. The top of the reactor was modified so that an aluminia lance tube could be immersed to near the bottom of the magnesium turnings. The top of the aluminia lance tube was fitted into a Swagelock fitting. The other end of the Swagelock fitting was fitted to a stainless steel tube. A length of stainless steel tubing was wound into a coil and placed in the oven so the gas would be preheated before it flowed in to the molten magnesium. The other end of the tube was attached external to the oven and hood to the blending stage for the organic reactants. In another port in the top of the reactor was fixed to another stainless steel tube that served as the exit port from the rector. That tube exited the oven and oven where it was chilled to cool the exiting gas before it entered the Erlenmeyer flask. This was attached to a large Erlenmeyer flask that served as a ballast tank. An exit port from the Erlenmeyer flask went to a bubbler so the gas flow through the system could be monitored. In one iteration of the system the argon was bubbled though a heated (T=35° C.) vessel of pentane. The pentane was twice the stoichiometric ration need for compete conversion of the magnesium to magnesium sesquacarbide. In a second iteration of the system pure dry methane gas was blended with argon gas and bubbled into the molten magnesium. In both cases magnesium sesquacarbide samples were prepared. Only very small samples of the sesquacarbide were produced. In order to do the proposed experiments the experimental system will have to be upgraded but the chemistry remains the same. See, for example, FIG. 1 for a reaction system.

What is claimed is:

1. A method of producing elemental carbon and hydrogen comprising reacting at least one hydrocarbon in molten magnesium at a temperature sufficient to melt the magnesium, wherein said reaction produces elemental carbon and hydrogen, and wherein the reaction is carried out with a magnesium halide also present.

2. A method of producing elemental carbon and hydrogen comprising reacting methane in molten magnesium at a temperature range of about 600° C. to 1000° C., wherein said reaction produces elemental carbon and hydrogen, and wherein the reaction is carried out with a magnesium halide also present.

3. The method of claim 1, wherein the hydrocarbon is a gas at 25° C. and 760 torr.

4. The method of claim 1, wherein the hydrocarbon is a liquid at 25° C. and 760 torr.

5. The method of claim 1, wherein the hydrocarbon is a solid at 25° C. and 760 torr.

6. The method of claim 1, wherein the hydrocarbon is methane.

7. The method of claim 1, wherein the temperature is in a range selected from the group consisting of from about 600° C. to about 950° C., from about 600° C. to about 900° C., from about 650° C. to about 950° C., from about 650° C. to about 900° C., from about 700° C. to about 950° C., from about 700° C. to about 900° C., from about 650° C. to about 1,000° C., from about 700° C. to about 1,000° C.

8. The method of claim 2, wherein the temperature range is about 600° C. to about 950° C.

9. The method of claim 2, wherein the temperature range is about 650° C. to about 900° C.

10. The method of claim 2, wherein the temperature range is about 650° C. to about 1,000° C.

11. The method of claim 2, wherein the temperature range is about 700° C. to about 950° C.

12. The method of claim 2, wherein the reaction takes place in a single vessel.

13. The method of claim 1, wherein the reaction is carried out under continuous conditions.

14. The method of claim 1, further comprising the step of isolating the carbon.

15. The method of claim 1, wherein the reaction occurs via a carbide intermediate.

16. The method of claim 1, wherein the reaction occurs via a sesquacarbide intermediate.

17. The method of claim 1, wherein the magnesium halide is magnesium chloride.

18. The method of claim 2, wherein the magnesium halide is magnesium chloride.

* * * * *